Aug. 24, 1948. E. E. ARNOLD 2,447,482
TURBINE APPARATUS
Filed April 25, 1945 2 Sheets-Sheet 1
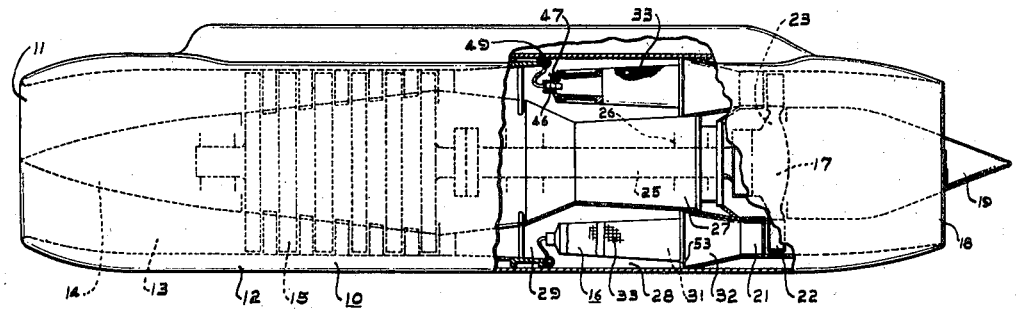
FIG. 1.
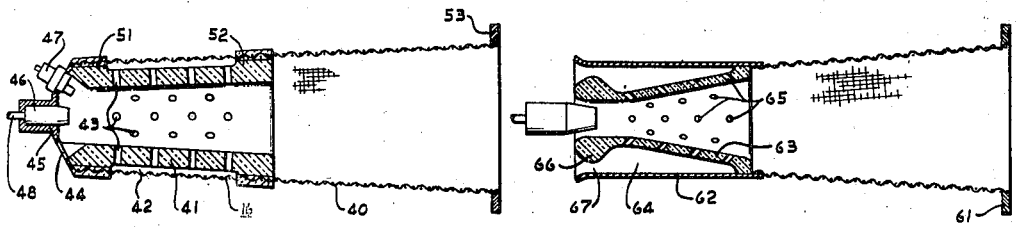
FIG. 2.   FIG. 5.
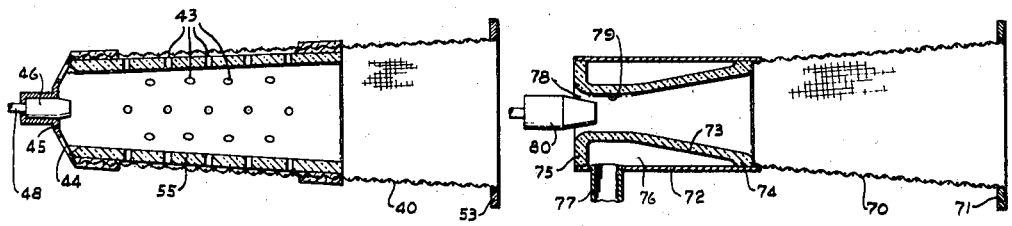
FIG. 3.   FIG. 6.
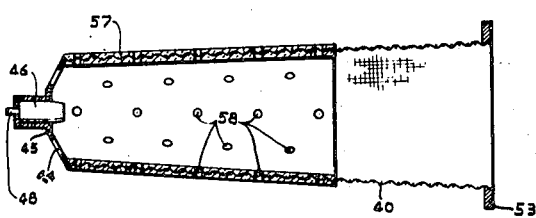
FIG. 4.
INVENTOR
EDWIN E. ARNOLD
BY
ATTORNEY Aug. 24, 1948.  E. E. ARNOLD  2,447,482
TURBINE APPARATUS Filed April 25, 1945  2 Sheets-Sheet 2

INVENTOR
EDWIN E. ARNOLD
BY
ATTORNEY

UNITED STATES PATENT OFFICE 2,447,482

TURBINE APPARATUS

Edwin E. Arnold, Pittsburgh, Pa., assignor to Westinghouse Electric Corporation, East Pittsburgh, Pa., a corporation of Pennsylvania Application April 25, 1945, Serial No. 590,285

2 Claims. (Cl. 263—19)

This invention relates to power plants, particularly to combustion apparatus for a gas turbine, and it has for an object to provide an improved device of the character set forth.

The present invention, although not limited thereto, is particularly adapted for use in a gas turbine power plant of the type employed on aircraft to drive the propeller, electric generator or supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and turbine for heating the compressed air and which discharges the hot gases at a suitable temperature and pressure to the turbine. The spent gases on leaving the turbine are discharged through a nozzle provided at the rear of the casing and may aid in propelling the aircraft.

It is desirable that the physical dimensions and weight of a plant of this character be kept at an absolute minimum, and consequently the combustion apparatus must be small, requiring it to function with high velocities of flow and to realize rates of energy release of the order of $30 \times 10^6$ B. t. u. per cubic foot per hour.

If the power plant is mounted in a nacelle or built into a wing, and even when mounted in the fuselage, the frontal area of the plant should be maintained at a minimum to reduce drag, with the result that the velocities of the hot gases leaving the combustion apparatus are high and these velocities should be about 200 to 300 feet per second.

It is, accordingly, a further object to provide a combustion apparatus of small size which is capable of handling a large volume of air and fuel mixture and complete combustion of the fuel in a relatively small space.

A power plant of this character operates over a wide range of fuel rates since the fuel rate for peak load, as at take-off, may be as much as ten times that for idling at high elevation. Further, the combustion apparatus must be able to burn the fuel and heat the air supplied by the compressor to a peak temperature, which may be 1500° F. or even higher, without danger of distorting the walls or causing excessive creep or corrosion of the apparatus.

The pressure drop across the combustion chamber, comparing the state at two stations of equal velocity, should be kept at an absolute minimum since the pressure drop decreases the power which can be developed by the turbine driven by the hot gases discharging from the combustion apparatus.

The above-mentioned features, limitations, and requirements for the combustion apparatus of the gas turbine power plant for aircraft use apply also, but perhaps not as critically, to gas turbine power plants on small vessels of high power and speed, particularly naval craft or in any installation where space and weight are at a premium. It is, accordingly, a further object of the invention to provide an improved combustion apparatus capable of satisfying the above-mentioned limitations and requirements in a gas turbine power plant.

These and other objects are effected by the invention as will be apparent from the following description and claims taken in accordance with the accompanying drawings, forming a part of this application, in which:

Fig. 1 is a side elevation of a gas turbine power plant incorporating the features of the present invention, portions of the structure being broken away for the sake of clearness;

Figs. 2, 3, 4, 5 and 6 are vertical sectional views through various modifications of the combustion apparatus;

Figure 7:
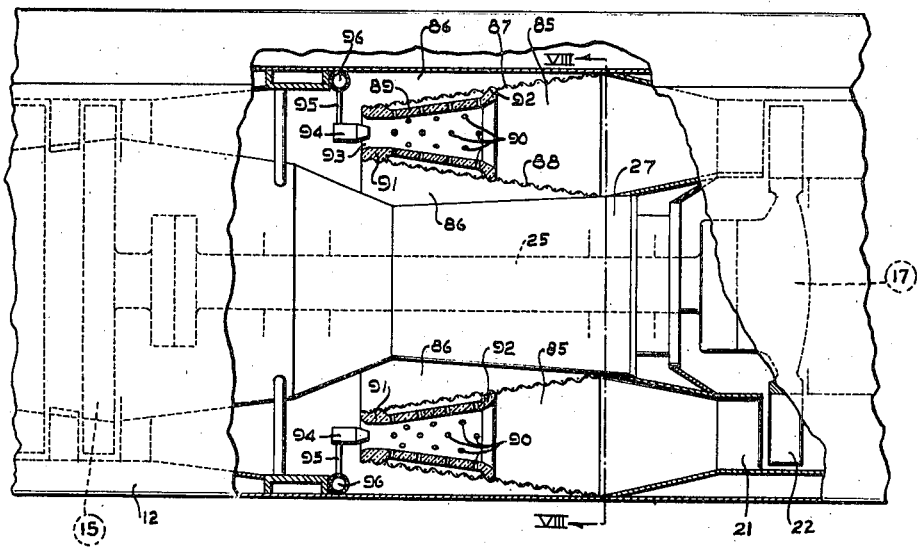
Fig. 7 is a fragmentary sectional view of another form of combustion apparatus for a power plant of the type illustrated in Fig. 1.

The power plant shown in Fig. 1, and generally indicated 10, is adapted to be mounted in or on the fuselage or wing of an airplane, with the left or intake end 11, as viewed in this figure, pointed in the direction of flight.

The plant comprises an outer shell or casing structure 12, providing an annular air duct or passage 13, extending fore and aft with respect to the aircraft. This casing has mounted therein along its longitudinal axis a fairing cone 14 adapted to house fuel and lubricating pumps and ignition apparatus, an axial-flow compressor 15, combustion apparatus, generally indicated 16, a turbine 17 which drives the compressor, and a nozzle 18 defined by the casing 12 and by a tailpiece 19; the latter being mounted concentrically in the casing and cooperating with the latter to provide for a propulsion jet.

Air enters at the intake end 11 and flows substantially straight through the plant, passing through the compressor 15, where it is compressed, and into the combustion apparatus 16, where it is heated. The hot gases, comprising the products of combustion and excess air heated by the combustion, on leaving the combustion apparatus are directed by suitable guide vanes or nozzles 21 against the blades 22 of the turbine disc 23 and then are discharged through the propulsion nozzle 18 to propel the aircraft.

The present invention is not limited to the specific details or arrangement of the structure thus far described, but it is primarily concerned with the combustion apparatus, which heats the compressed air supplied by the compressor without disturbing the straight-through flow of the plant, thereby permitting a design of small maximum diameter.

By reference to Fig. 1, it will be noted that the compressor and turbine rotors are interconnected by means of a shaft 25 supported in suitable bearings, indicated at 26, and enclosed by an inner casing structure, generally indicated 27, which protects the shaft and bearings from high temperatures and also defines the portion of the annular air flow passage 13 in which the combustion apparatus 16 is mounted.

In order to maintain the combustion apparatus and the outer casing structure of small maximum diameter, the combustion apparatus is divided by wall structure into an air space or spaces 28, open to the discharge end of a diffuser passage 29 leading from the compressor, and which overlap a burner space or spaces 31, open to a passage 32 leading to the turbine guide vanes 21. Atomized fuel is supplied to the forward end of the burner space or spaces which are also provided with ignition means. The dividing wall structure has openings therein to provide for entry into the burner space of compressed air from the overlapping air spaces, the entering air supporting combustion of fuel and mixing with the hot products of combustion to provide a motive fluid comprising a mixture of air and products of combustion of suitable temperature for driving the turbine.

The dividing wall structure separating the air and burner spaces may be constituted in any suitable manner, provided that it is disposed so that the air space overlaps axially the burner space or spaces and so that air may flow into the latter along the structure to enable combustion to be completed or substantially completed within the axial length of the burner spaces. In this way, the axial length of the apparatus is kept at a minimum because it does not require the division of the air stream into two distinct streams of primary and secondary air, the primary air being used to complete the combustion, with the remaining secondary air stream being mixed with the combusted gases to lower the final temperature.

The dividing wall structure is, furthermore, arranged to provide an air space or spaces which converge and a burner space or burner spaces which diverge in a downstream direction, so that there is a minimum velocity of the combusted gases within the burner spaces, resulting in completion of the combustion within the shortest possible length and reduction in the flow losses.

The combustion apparatus illustrated in Fig. 1, and indicated by the reference character 16, comprises a plurality of combustion cells or cones 33, preferably arranged in annular formation, a single one of these units being illustrated in Fig. 2, wherein the reference character 40 indicates a frusto-conical foraminated wall preferably of woven or mesh-like metallic material, providing, in the portion thereof of smaller cross section, a combustion zone, with the portion of larger cross section providing a mixing and cooling zone for the hot products of combustion passing thereto from the combustion zone.

To improve combustion apparatus performance and to insure of maximum ignition of fuel therein, it is desirable to heat the gases therein to the maximum possible temperature and to this end the combustion zone or chamber is provided with a liner 41 of a mineral material, having the qualities of ceramic substances. Porcelain has been found to be highly satisfactory for this purpose. Such a liner produces a condition of incandescence within the lined combustion zone, thereby effecting complete combustion of the fuel.

The outer surface of the liner 41 is preferably spaced inwardly from the adjacent surrounding portion of the foraminated wall 40 to provide therebetween a space 42 for ready flow of secondary air through the wall 40 to a plurality of secondary air inlet openings 43, extending through the liner 41 from the space 42 to the interior of the combustion chamber.

Preferably, primary air is admitted to the smaller end of the combustion chamber through a plurality of openings 44, formed in the end member 45, in which end member is mounted a nozzle 46, through which fuel is sprayed into the combustion chamber and ignited by suitable means, such as the electric igniter 47. Fuel is supplied to the nozzle 46 through a conduit 48 from a fuel manifold 49, adapted to supply fuel to all of the plurality of combustion cells or cones 16.

Preferably, the liner 41 is secured in place within the frusto-conical wall 40 by provision of radially-extending annular flanges 51 and 52 at opposite ends thereof, these flanges being of ceramic material similar to the material of the liner and being united with the wall 40 by permeation of the latter by the former.

The larger end of the combustion cone is preferably provided with a radially-extending flange 53 whose periphery is in the form of a segment of an annulus, whereby, when a plurality of such combustion members are assembled in annular series, the flanges 53 of adjacent members abut and cooperate to form a continuous annular closure structure between adjacent cells, preventing flow of air directly from the air space 28 to the passage 32 leading to the turbine in the nozzles 21, all such air being forced to pass through the combustion members.

In Fig. 3 there is illustrated a construction which differs from that just described in connection with Fig. 2, in that the liner 55 is of thinner wall structure, and of a length defining a greater proportion of the total length of the frusto-conical member 40.

In the construction of Fig. 4 the liner 57 is not spaced from the member 40 but is united thereto by permeation throughout its length and is, preferably provided with a plurality of openings 58 for entrance of secondary air to the combustion zone.

In Fig. 5 there is illustrated an arrangement wherein means is provided for furnishing secondary air to the combustion chamber at a slightly greater pressure than that of the primary air supplied thereto. In this arrangement the mixing and tempering zone is defined by a frusto-conical foraminated wall structure, preferably of woven or mesh material, having at its larger or discharge end a radially-extending flange 61, corresponding in shape and function to the flange 53 of the previously described arrangements.

The combustion chamber is formed by an outer tubular member 62 and an inner frusto-conical member 63, preferably of ceramic material and spaced from the outer member 62 throughout the major portion of its length to define therebetween a secondary air space 64, from which air is admitted to the combustion chamber through a plurality of openings 65. The smaller end of the frusto-conical liner 63 is provided with an annular enlargement 66, extending radially outward and defining, with the adjacent surrounding portion of the outer tubular member 62, a restricted orifice type inlet 67, for entrance of secondary air to the space 64. Inasmuch as this entrance 67 is in the form of an orifice, the pressure of air within the space 64 will be slightly higher than that of the primary air which enters the combustion chamber through the annular space surrounding the fuel nozzle. With this secondary air entering the combustion chamber at a higher pressure than the primary air supplied thereto, improved mixing of such secondary air with the combustion gases is obtained.

While in all of the constructions so far described, the liners have been provided with perforations or openings for secondary air, it will be apparent to those familiar with the art of refractories or ceramics and kindred material, that under certain conditions the provision of openings may not be necessary and the natural porosity of the refractory or ceramic material may be relied upon to pass a sufficient quantity of secondary air to the combustion chamber.

In Fig. 6 there is illustrated a modification where such porosity of the ceramic liner 73 is relied upon for passage of air to the combustion chamber from the space 76 provided between the liner and the outer tubular member 72. In this construction the mixing and cooling chamber is formed by frusto-conical mesh wall material 70, having a flange 71 corresponding to the flanges 53 of the device illustrated in Figs. 2, 3 and 4, and the liner 73 having radially-extending outer flanges 74 and 75 at opposite ends thereof, joined to, or abutting against, the adjacent portions of the outer tubular wall 72 to close the secondary air space 76. Secondary air, preferably under higher pressure than the primary air, is supplied to the space 76 through suitable conduit means 77, the primary air entering the combustion chamber through the annular space 78 provided between the throat 79 of the liner and the nozzle 80.

Figure 8:
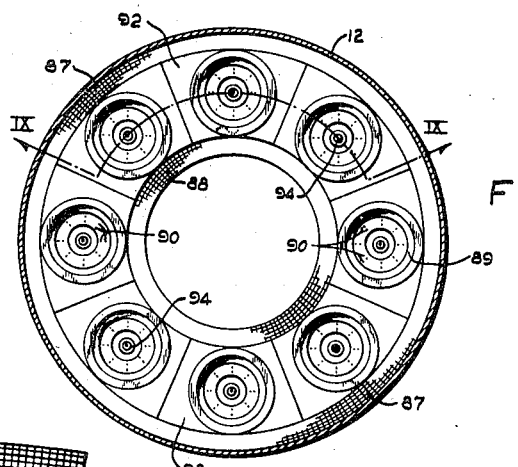
Fig. 8 is a sectional view taken along the line VIII—VIII of Fig. 7, looking in the direction indicated by the arrows.
Figure 9:
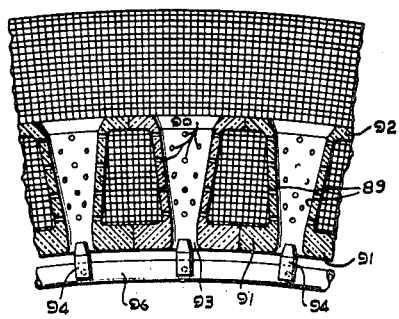
Fig. 9 is a sectional view taken along the line IX—IX of Fig. 8, looking in the direction indicated by the arrows.

In Figs. 7, 8 and 9 there is illustrated a somewhat different arrangement of combustion apparatus, wherein the combustion space 85 is separated from the overlapping air spaces 86 by a foraminated wall structure, formed by frusto-conical wall members 87 and 88 disposed in axially overlapping relation, with the outer member 87 having its base disposed in the downstream direction and the inner member 88 having its base disposed in the upstream direction, whereby there is provided an annular combustion space 85 of frusto-conical cross section considered in the direction of fuel flow.

This single annular combustion chamber 85 is provided with a plurality of liners 89, each having a plurality of openings 90 through the side walls thereof for passage of secondary air to the spaces within. Preferably, these liners are of frusto-conical outline and are provided at each end with outwardly-extending radial flanges 91 and 92, the peripheries of which flanges have the outlines of segments of an annulus (Figs. 8 and 9).

It will be apparent that the abutting flanges 91 and 92 of adjacent liners 89 provide complete annular closure members at each end of the annular series of liners, thereby preventing flow of air longitudinally between adjacent liners.

Primary air is admitted to each of the liners through the annular opening 93 surrounding the nozzle 94, fuel being supplied to the liners through the conduits 95 from the fuel manifold 96.

It will be apparent that these various constructions provide an arrangement wherein fuel and primary air are supplied to a frusto-conical combustion chamber, at one end thereof, and secondary air is added by means of openings formed through the side walls of the liner or by means of the natural porosity of the liner material. Inasmuch as these liners are of mineral, refractory, or ceramic material, they aid in producing a condition of incandescence within the combustion zone, resulting in maximum combustion of the fuel therein. As the highly heated gases leave the combustion zone and enter the cooling and mixing zone defined by the frusto-conical wall of foraminous material, additional air passes thereinto for admixture with the hot gases to reduce the excessive temperature thereof to suitable values.

While I have shown the invention in several forms, it will be obvious to those skilled in the art that it is not so limited, but is susceptible of various other changes and modifications without departing from the spirit thereof.

What is claimed is:

1. In a gas turbine plant combustor supplied with fuel and furnishing motive fluid mixture of products of combustion and air for operating a turbine driving a compressor which supplies air to the combustor to support combustion of fuel and to mix with the resulting products of combustion to produce a motive fluid mixture of suitable temperature, said combustor including an elongated wall structure bounded externally by a space supplied with air under pressure and bounding an interior elongated passage which diverges in the downstream direction; and means for supplying fuel to the upstream end of said passage; said wall structure having openings providing for flow of air from the external bounding space to the interior passage at the upstream end of the latter and throughout its length, including upstream and downstream sections bounding combustion zone and mixing zone portions of the passage, and embodying a foraminous wall member providing said downstream section with the aforesaid openings of the latter constituted by its foraminations and a refractory wall member joined to the foraminous wall member to provide said upstream section with the refractory wall member bounding the combustion zone portion of the passage; and said openings being so distributed over said sections that combustion of the fuel, aided by incandescence of the refractory wall member, is completed in the combustion zone portion of the passage and the resulting products of combustion are mixed with air in the mixing zone portion of the passage to provide motive fluid mixture of suitable temperature leaving the downstream end of the passage.

2. Apparatus as claimed in claim 1 wherein the foraminous wall member extends for substantially the full length of said wall structure and said refractory wall member is joined to its upstream section so as to extend interiorly thereof.

EDWIN E. ARNOLD.

REFERENCES CITED

The following references are of record in the file of this patent:

UNITED STATES PATENTS

| Number | Name | Date |
|---|---|---|
| 635,919 | Curtis | Oct. 31, 1899 |
| 1,102,345 | Lemale | July 7, 1914 |
| 1,450,229 | Robinson | Apr. 3, 1923 |
| 2,033,010 | Russel | Mar. 3, 1936 |
| 2,072,731 | Crosby | Mar. 2, 1937 |
| 2,268,464 | Seippel | Dec. 30, 1941 |
| 2,280,765 | Anxionnax | Apr. 21, 1942 |
| 2,326,072 | Seippel | Aug. 3, 1943 |

FOREIGN PATENTS

| Number | Country | Date |
|---|---|---|
| 20,604 | England | Sept. 24, 1903 |
| 463,942 | France | Dec. 30, 1913 |
| 542,528 | France | May 18, 1922 |
| 484,289 | England | May 3, 1938 |
| 691,430 | Germany | May 25, 1940 |
| 879,123 | France | Nov. 10, 1942 |